(No Model.)  G. CROMPTON & H. WYMAN.  6 Sheets—Sheet 2.
LOOM.
No. 264,864.  Patented Sept. 26, 1882.
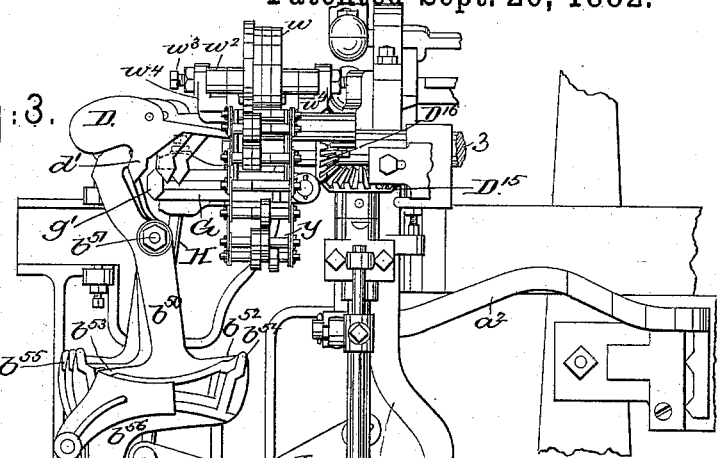
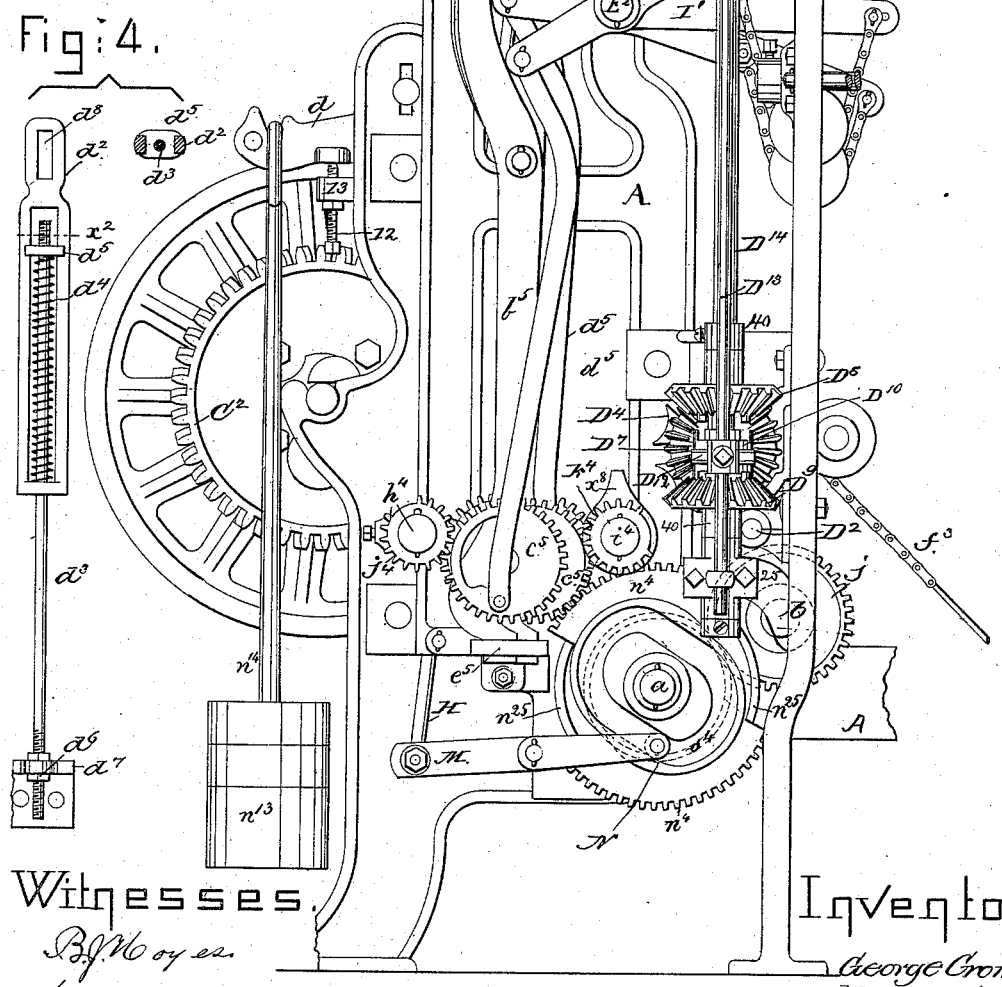

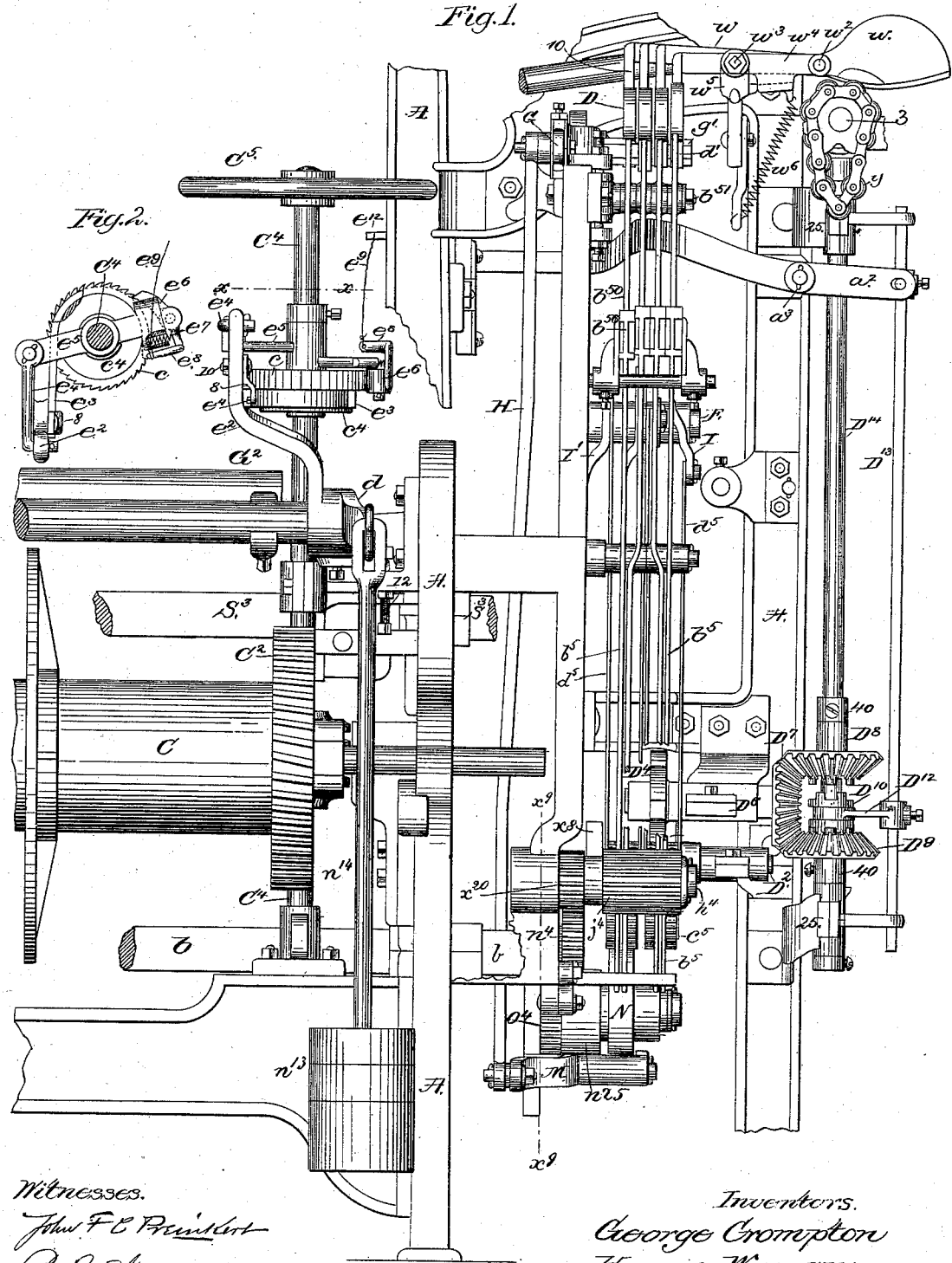

(No Model.) 6 Sheets—Sheet 3.

G. CROMPTON & H. WYMAN.
LOOM.

No. 264,864. Patented Sept. 26, 1882.

Witnesses.
John F. C. Prinkert
Bernice J. Noyes.

Inventors.
George Crompton
Horace Wyman
by Crosby & Gregory
Attys.

(No Model.) 6 Sheets—Sheet 4.
G. CROMPTON & H. WYMAN.
LOOM.
No. 264,864. Patented Sept. 26, 1882.
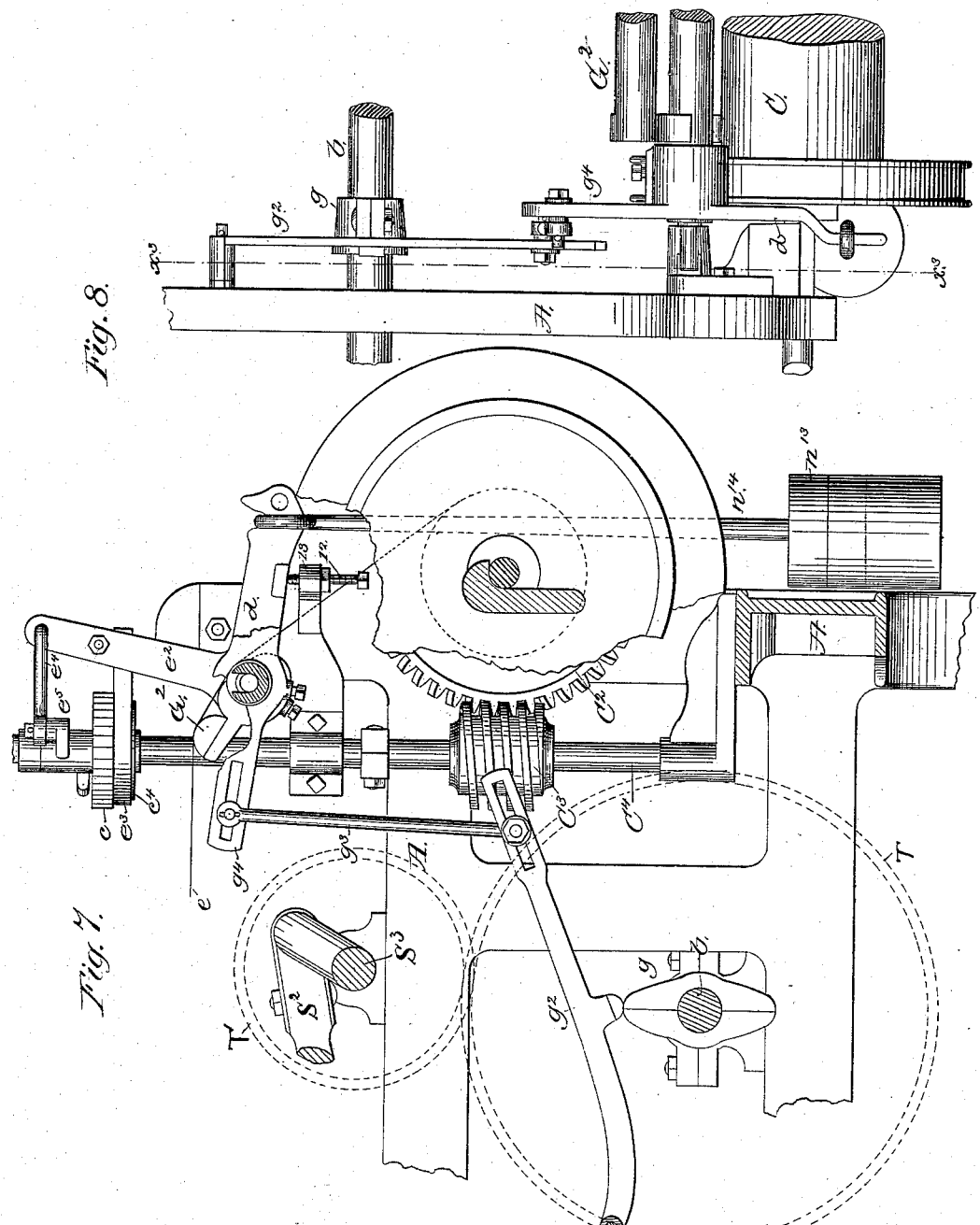
Witnesses.
John F. C. Prinkert
Bernice J. Noyes.
Inventors.
George Crompton
Horace Wyman
by Crosby & Gregory
Atty's.

(No Model.)

G. CROMPTON & H. WYMAN.

LOOM.

No. 264,864.

6 Sheets—Sheet 5.

Patented Sept. 26, 1882.

Witnesses.
B. J. Noyes.
John F. C. Prindert.

Inventors.
George Crompton
Horace Wyman
by Crosby Gregory
Attys.

N. PETERS, Photo-Lithographer, Washington, D. C.

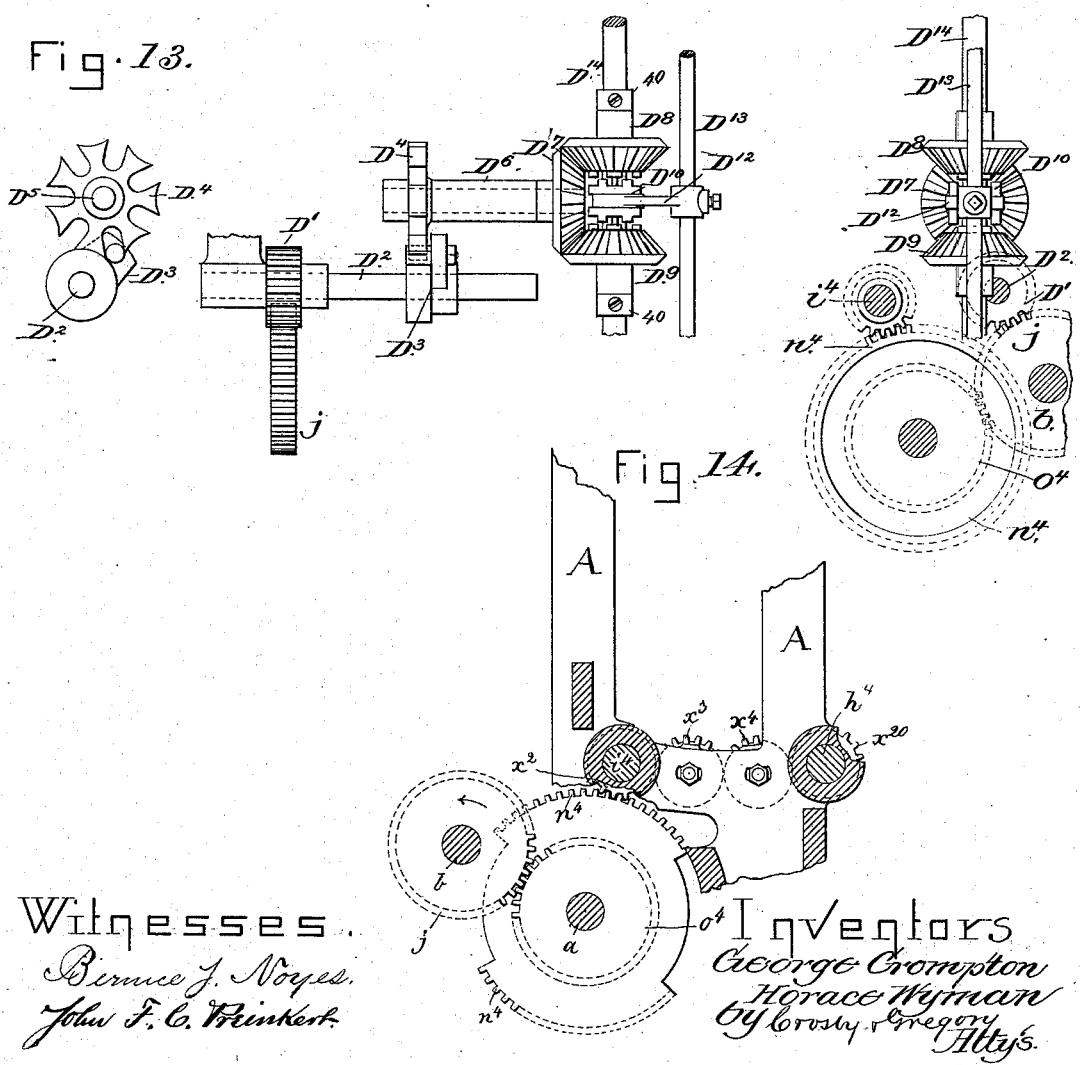

UNITED STATES PATENT OFFICE.

GEORGE CROMPTON AND HORACE WYMAN, OF WORCESTER, MASSACHUSETTS, ASSIGNORS TO SAID CROMPTON.

LOOM.

SPECIFICATION forming part of Letters Patent No. 264,864, dated September 26, 1882.

Application filed January 26, 1882. (No model.)

*To all whom it may concern:*

Be it known that we, GEORGE CROMPTON and HORACE WYMAN, both of Worcester city, county of Worcester, State of Massachusetts, have invented an Improvement in Looms, of which the following description, in connection with the accompanying drawings, is a specification.

This invention in looms relates to certain improvements in devices forming part of the shuttle-box-moving mechanism, to means for driving the pattern-surface-carrying shaft in a backward or forward direction at will by power derived from the cam or other cross-shaft of the loom, and to an improved organization of mechanism constituting or forming part of a let-off, as will be hereinafter more fully described, and pointed out in the claims at the end of this specification.

Figure 5:
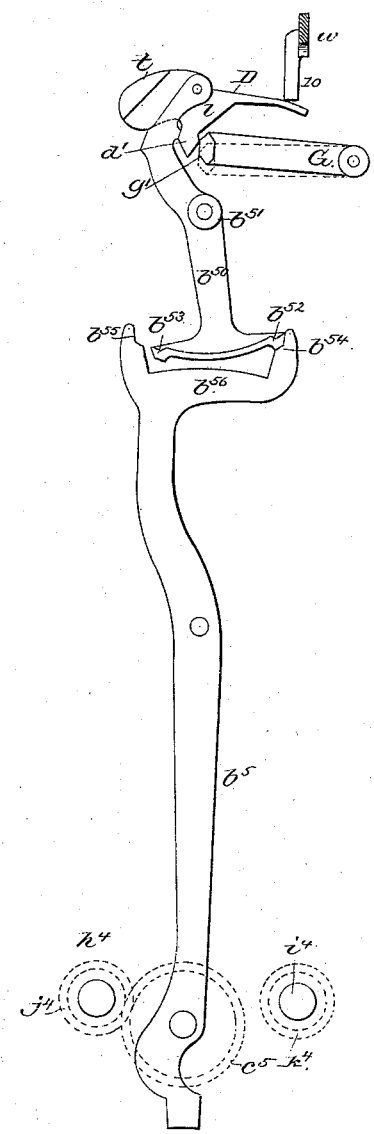
Figure 6:
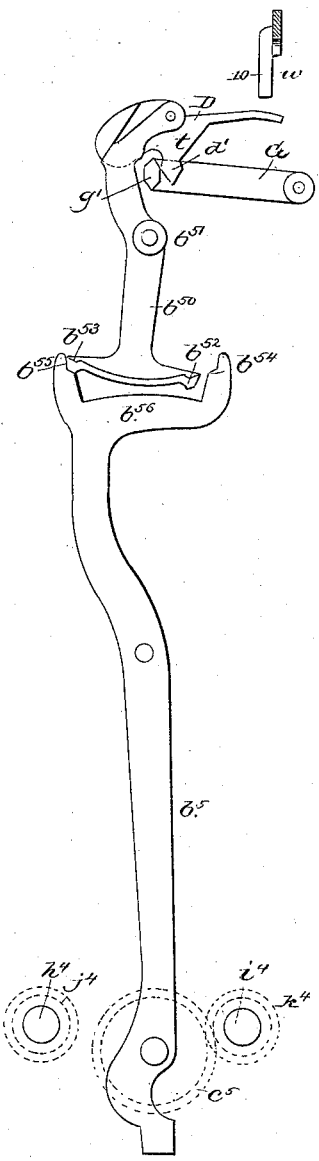
Figure 10:
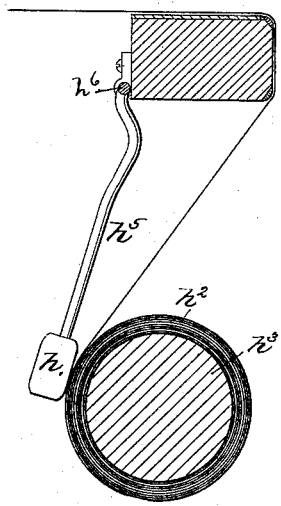
Figure 9:
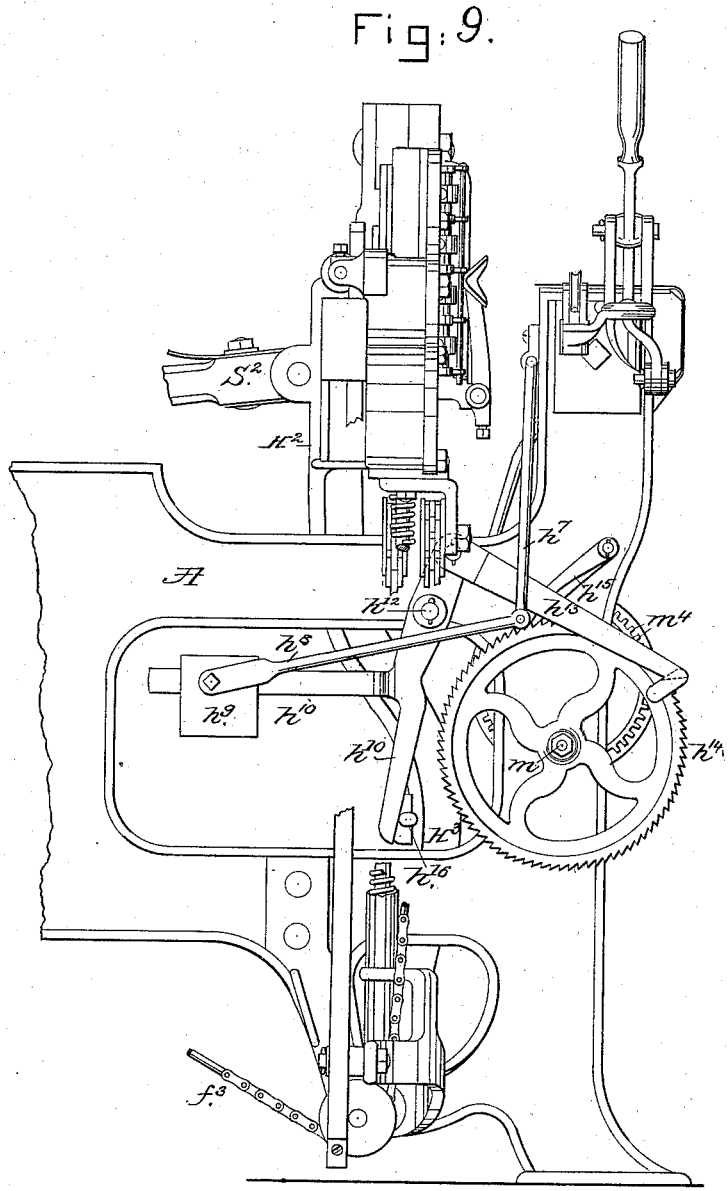

Figure 1 represents a partial and broken rear side elevation of the left-hand end of a loom provided with our invention; Fig. 2, a sectional detail on the dotted line $x\ x$, Fig. 1, of the pawl-and-ratchet contrivance for operating the shaft carrying the worm which turns the warp-beam to let off the warp; Fig. 3, an elevation of a portion of the left-hand end of the loom; Fig. 4, a detail showing, in side elevation and section on the line $x^2$, a modified form of whip-roll controller which we may use instead of the usual rod and weight shown in Figs. 1 and 3. Figs 5 and 6 are details showing certain novel-shaped shifting-levers and intermediate selector-carrying levers to both actuate the said shifting-levers and to hold them locked in such position as to retain their toothed cranks in gear with either of the usual rotating long fluted gears. Fig. 7 is a vertical section of the let-off mechanism in the line $x^3\ x^3$, Fig. 8, looking toward the right of the loom, it showing the main parts of the let-off mechanism which are represented in Fig. 1, as if the latter figure was viewed from the left, the arm $d$ shown in Fig. 8 and parts of the heads of the warp-beam being broken out to show the worm-gear and part of the like arm $d$, (shown in Fig. 1 at the right of the whip-roll.) This Fig. 7 shows in dotted lines gearing to drive the cam-shaft from the crank-shaft, as in our Patent No. 238,575. Fig. 8 is a top view of part of the mechanism shown in Fig. 7, the said Fig. 8 showing at the left of the dotted line $x^3$ a part of the loom-frame not shown in Fig. 7; Fig. 9, a portion of the left-hand end of the loom omitted from the right of Fig. 3 to show the lay, the take-up, and part of the shuttle-box mechanism, a portion, however, of the latter being broken away; Fig. 10, a sectional detail of the take-up mechanism, showing the lever which bears against the cloth on the cloth-beam and regulates the action of the take-up mechanism in accordance with the quantity of cloth on the cloth-beam. Figs. 11 and 12 are details showing the mechanism between the cam-shaft and upright shaft which actuates the shaft which carries the pattern-surface. Fig. 13 is a detail showing only the star-wheel and pin-wheel represented in Fig. 12; and Fig. 14, a sectional detail on the line $x^9$, Fig. 1, showing parts of the gear for moving the long pinions, a part of the frame-work A being broken out to better show the pinions.

In connection with the loom represented in this our present invention it will be understood that we will employ shed-forming mechanism and pattern mechanism therefor substantially such as represented in our United States Patent No. 238,575, granted to us March 8, 1881, to which reference may be had, and so also the shuttle-box levers, the devices to move them from the rotating toothed cranks, and the connecting devices between the said shuttle-box levers and the shuttle-box rod, and the shuttle-boxes will be substantially as in the said patent; but it will be understood that we may employ instead of the particular shuttle-box levers therein shown any other well-known and suitable levers used to move shuttle-boxes.

We have herein aimed as much as possible to designate the devices common to this application and the said patent with the same letters, and in this application like letters designate like parts.

The loom-frame A will be of suitable shape to sustain the working parts.

The usual cam-shaft, $b$, of the loom (shown best in Fig. 3) has upon it a pinion, $j$, which engages a gear, $o^4$, (see Figs. 1, 11, and 14,) such as common to the patent just referred to, and to patent No. 230,243, granted to us July 20, 1880, the said gear $o^4$ being fixed at the rear side of gear $n^4$, also common to our said patents. The toothed parts of the gear $n^4$ during its rotation intermittingly engage the teeth of a small pinion, $x^2$, having preferably nineteen teeth, fast on stud or shaft $i^4$, which carries the long fluted gear $k^4$, the said gear having connected with one end of it the stop $x^8$, having a concaved face to at times meet the smooth projecting flanges $n^{25}$ of the gear $n^4$, the said flanges being located between the toothed parts, as clearly shown in Fig. 3. The pinion $x^2$ engages a pinion, $x^3$, of preferably twenty-one teeth. Pinion $x^3$ engages a like-sized pinion, $x^4$, and the latter engages the pinion $x^{20}$, of same size as pinion $x^2$, but fast on the stud or shaft $h^4$, carrying the long fluted gear $j^4$, the studs carrying the pinions $x^3$ $x^4$ and the shafts $i^4$ $h^4$ being sustained in a rigid part of the frame-work A. The pinions $x^2$ $x^3$ $x^4$ $x^{20}$ are the same as in our Patent No. 238,575. The gear $n^4$ has at its face a cam, N, having groove $s^4$, to receive a roller of a lever, M, connected by link H with a lever, G, (see Figs. 1, 3, 5, and 6,) provided with a wedge-bar, $g'$, which, when elevated, will strike against one or the other of the two inclined sides of the feet $d'$ of the selectors D, substantially such as shown in United States Patent No. 238,575, granted to us, the said selectors having their fulcra upon pins at the upper ends of the auxiliary or intermediate selector-carrying levers, $b^{50}$, pivoted at $b^{51}$.

To operate the shuttle-box levers I I', having their fulcra at $E^2$, (see Fig. 3,) we employ toothed cranks $c^5$, links $d^5$, and fluted or toothed gears $j^4$ $k^4$, on studs $h^4$ $i^4$, with which gears one or the other edge of the said toothed cranks are engaged, all as shown and described in our said patents. The shifting-levers $b^5$, which carry and move the toothed cranks $c^5$ into engagement with one or the other of the said gears $j^4$ $k^4$, differ from those in our said patents only in the construction of their upper ends, which are herein shown provided with forked heads $b^{56}$, the arms at the ends of the said forks being provided with inclines or notches $b^{54}$ $b^{55}$, adapted to be engaged by the toes or lugs $b^{52}$ or $b^{53}$ of the selector-carrying levers $b^{50}$. When the toe $b^{52}$ engages the end $b^{54}$ of the lever $b^5$, as in Fig. 5, the said lever will be locked in position with the toothed cranks $c^5$ in engagement with gear $j^4$, and when the toe $b^{53}$ engages the part $b^{55}$ of lever $b^5$ the latter will be locked in position with toothed crank $c^5$, engaged with gear $k^4$, as in Fig. 6.

The gear $j$, before described as on the cam-shaft, as shown in Fig. 12, engages a small gear, D', on a short shaft, $D^2$, provided with a pin-wheel, $D^3$, or pin-carrying arm, (see Figs. 12 and 13,) which is made to engage with a star-wheel, $D^4$, on a short shaft, $D^5$, (shown in section, Fig. 13, and in dotted lines in Fig. 12,) held in the bearing $D^6$, the said shaft being provided with a bevel-gear, $D^7$, which is engaged constantly with two bevel-gears, $D^8$ $D^9$, each of which, while loose upon the upright shaft $D^{14}$, held in bearings secured to the frame-work, is held by a fixed collar, 40, in engagement with the bevel-gear $D^7$. Each of these bevel-gears $D^8$ $D^9$ has its small end notched or provided with clutch-teeth, as shown clearly in Figs. 11 and 12, to be engaged by the toothed ends of a clutch-sleeve, $D^{10}$, splined to slide upon but rotate with the said shaft, the clutch-sleeve being adapted to be thrown into engagement with the clutch-teeth of one or the other of the said bevel-gears $D^8$ $D^9$, to drive the upright shaft $D^{14}$ in one or the other direction and turn the pattern-chain shaft 3 and usual pattern surfaces or chains thereon in one or the other direction. The collar or sleeve $D^{10}$ is grooved to receive about it the yoke $D^{12}$, connected with rod $D^{13}$, having attached to it a lever, $a^2$, pivoted at $a^3$ and extended forward to the front of the loom, where it may be grasped by the operator when it is desired to turn the shaft $D^{14}$ in one or the other direction. The shaft $D^{14}$, at its upper end, has a bevel-gear, $D^{15}$, which engages a bevel-gear, $D^{16}$, on the shaft 3. This shaft 3 in practice, besides carrying the usual pattern surface or chain (not shown) for the shedding mechanism, will, as in the United States Patent No. 238,575, March 8, 1881, be made to carry the shuttle-box pattern surface or chain, herein marked $y$, upon which rest the rearmost or weighted ends of the fingers $w$, pivoted at $w^2$ between ears of a yoke, $w^4$, the yoke being in turn pivoted at $w^3$ upon a bracket, $w^5$, the said yoke being normally held down in position, with the weighted ends of the fingers $w$ against the pattern-surface, by a spring, $w^6$. (Shown in Fig. 1.) The positions of the fingers $w$, which have downwardly-turned ends 10, are determined by the rolls and spaces on the shuttle-box pattern-surface $y$, so that the ends 10 of the fingers will at times touch the selectors, as in Fig. 5, or be held above them, as in Fig. 6.

The pattern-surfaces for the shuttle-box and shedding mechanism will, as herein provided for, be rotated in unison, they being moved while the shed is closed and while the selectors hold the toothed cranks in engagement with their actuating-gears, the shuttle-boxes at that time moving and changing their position, and while the next shed is being formed the shuttle-boxes arrive in their position, and the selectors are then released and move to assume the position designated by the rolls of the pattern-chain $y$ then in contact with the fingers $w$, such rolls indicating the next position or change of shuttle-boxes. The change of pattern to effect the selection of any one shuttle-box takes place while the wedge $g'$ is elevated against one or the other side of the toes or wedge-points $d'$ of the selectors D, at which time the selectors and the selector-carrying levers, and with them the shifting-levers, are held locked in position, as before described. When this change in position of the shuttle-box pattern-surface in advance of the time of changing the shuttle-box takes place the yoke $w^4$ rises or turns about its pivot $w^3$ through the action of the rolls of the pattern-surface $y$ on the rear ends of the levers $w$; but as soon as the wedge $g'$ retires from the selectors the spring $w^6$ depresses the said yoke and the projections 10 of the fingers $w$, then bearing on the selectors, shift the said selectors according to those protuberances of the pattern-surface then uppermost, and which are to control the shuttle-box next to come into action.

The warp-beam C has upon it the worm-gear $C^2$, which is engaged by a worm, $C^3$, on an upright shaft, $C^4$, having at its upper end a hand-wheel $C^5$, and having fixed to it a ratchet-wheel, $c$, and a brake-wheel, $c^4$.

The whip-roll $G^2$ has backwardly-extended arms $d$, each provided with a notch to be engaged by the whip-roll elevating device, (shown in Figs. 1, 3, 7, and 8,) as a rod, $n^{14}$, having upon it suitable weights, $n^{13}$. If desired, however, we may employ instead devices such as shown in Fig. 4—viz., a link, $d^2$, a rod, $d^3$, a spring, $d^4$, and a nut, $d^5$, on the said rod above the said spring, the rod $d^3$ being connected by suitable nuts, $d^6$, with an ear or lug, $d^7$, attached to the frame-work. The open part $d^8$ of the loop $d^{12}$ will be placed over the arm $d$ of the whip-roll. Adjustment of the nut $d^5$ increases or decreases the downward strain on the arm $d$, and consequently increases or decreases the amount of the strain exerted by the whip-roll $G^2$ on the warp $e$. The shaft carrying the whip-roll $G^2$ has a second arm, $e^2$, provided with an adjustable ear, 8, held by a screw. This ear has connected with it a brake, $e^3$, which embraces the wheel $c^4$, the brake serving to prevent the shaft $C^4$ from turning farther than moved positively by the pawl $e^6$ to be described, the brake operating only when the whip-roll arrives at its most elevated position. The arm $e^2$ is connected by link $e^4$ with a pawl-carrier, $e^5$, mounted loosely upon the upright shaft $C^4$, the said carrier being provided at its other end with a pawl, $e^6$, operated upon by a spring, $e^7$, and held thereby in engagement with the ratchet $c$. The point to which the whip-roll $G^2$ ascends is controlled by the adjusting-screw 12 in an ear, 13, secured to the loom-frame, the said screw arresting the descent of the arm $d$. This adjusting-screw 12, by its change of position, enables the operator to regulate the upward throw of the whip-roll $G^2$ according to the class of fabric being woven—the lighter the fabric the higher the ascent of the whip-roll, that it may be more sensitive to the strain upon the yarn.

A string or cord, $e^9$, connected with the rear end, $e^8$, of pawl $e^6$, (shown in Figs. 1 and 2,) is extended forward, and has its front end attached to a pin, $e^{12}$, on the loom-frame within handy reach of the operator, so that he may, whenever desired, by pulling on the said string or cord keep the pawl $e^6$ from engagement when it is wished to move the hand-wheel $C^5$, which may be reached readily from the front of the loom, to turn the shaft $C^4$ and warp-beam and take back or let off yarn, as may be necessary.

In United States Patent No. 192,514, upon which our let-off is intended to be an improvement, a weight was depended upon to return the whip-roll into its most elevated position after each forward beat of the lay.

In large looms in some instances it has been found that the weight will not always fully lift the whip-roll into its elevated position, and so to insure the full rise of the whip-roll, which is necessary for the most perfect results and uniform weaving, we have added to the cam-shaft $b$ of the loom a cam, $g$, which operates upon a lever, $g^2$, connected by rod $g^3$ with an arm, $g^4$, secured to one end of the usual shaft forming part of the whip-roll, and by this cam and lever $g^2$ and the devices between the said lever and whip-roll we are enabled to positively restore or elevate the whip-roll to its highest position immediately after each forward beat of the lay $H^2$. The levers $g^2$ and $g^4$ are joined by the rod $g^3$, connected with them in an adjustable manner, (see Fig. 7,) to permit the lever $g^2$ to move the whip-roll into its proper elevated position to accord with the adjustment of the adjusting device or screw 12, before described.

With devices such as shown in Figs. 1 and 7 the effective stroke of the pawl $e^6$ upon the ratchet $c$ is due to movement of the whip-roll $G^2$, which may be more or less, according to the strain of the warp $e$ upon the whip-roll, and the said pawl is thus enabled to operate the said ratchet $c$ for one, two, or more teeth, as may be needed; but as soon as the whip-roll reaches its elevated position the brake $e^3$ engages the brake-wheel $c^4$ and stops the shaft $C^4$ and yarn-beam.

The take-up roll upon which the cloth is wound is actuated only as the cloth is moved forward by the lay acting upon the cloth at the fell. The pad $h$ is arranged to bear upon the cloth $h^2$ as it is wound upon the cloth-beam $h^3$, and is connected with a depending arm, $h^5$, of a rod, $h^6$, held in bearings at the rear side of the usual breast-beam, the opposite end, $h^7$, of the said rod being bent down and connected by the link $h^8$ with the shifting-weight $h^9$, placed loosely upon the backwardly-extended arm of the three-armed lever $h^{10}$, pivoted at $h^{12}$, and carrying the pawl $h^{13}$, which operates the ratchet $h^{14}$. This three-armed lever $h^{10}$ is moved positively to carry the pawl $h^{13}$ forward over the teeth of the ratchet $h^{14}$ by means of a pin, $h^{16}$, projecting from one of the legs $H^3$ of the lay, such pin being common. The pawl $h^{13}$ derives its backward or effective movement to turn the ratchet $h^{14}$ solely from the weight $h^9$.

The ratchet-wheel $h^{14}$ is placed upon a short shaft, $m$, having a pinion which is made to engage with an idle wheel of sufficient length to mesh with the teeth of gear $m^4$ at one end of the cloth-beam. As the cloth-beam increases in size greater power is required to rotate it.

This increase of power is provided for by automatically moving the weight $h^9$ farther back upon the lever $h^{10}$ through the instrumentality of the pad $h$ and the devices between it and the said weight, as described.

We have shown the usual crank-shaft, $S^3$, in Fig. 1, merely to show its location in the loom-frame. We have broken off the end of the crank-shaft outside the end of the loom-frame and have broken away the usual links and arms which operate the shedding mechanism, as in our patents referred to.

If the bevel-wheels $D^7$ $D^8$ $D^9$ were rotated continuously instead of intermittingly, there would be but a very short interval of time in which the notched hub $D^{10}$ could be engaged with the notched hubs of the gears $D^8$ $D^9$; but by the employment of the pin and star wheels $D^3$ $D^4$ the said gears $D^8$ $D^9$ are left at rest for very considerably intervals, affording ample time for the engagement of the hub $D^{10}$ with either wheel without unnecessary delay and without turning the cam or crank-shaft $b$ backward or forward to find the exact spot where engagement and disengagement can be made. The cam-shaft $b$ in practice will have fastened on it a large toothed gear, T, (shown in dotted lines, Fig. 7,) which will be engaged and rotated by a gear, T', (also in dotted lines,) on the usual crank-shaft, $S^3$.

We claim—

1. The long gears, suitable means to rotate them, the toothed cranks, the shifting levers having forked heads provided with notches, the selector-carrying levers having toes to engage the notches of the said forked heads, and the selectors pivoted on said carrying-levers, combined with a pattern-surface, means to operate it, fingers actuated thereby to move the selectors, and suitable means to act against the selectors and move the carrying-levers and shifting-levers, substantially as described.

2. The shaft 3, pattern-surface carried thereby, the upright intermittingly-rotating shaft $D^{14}$, and gearing to connect it with the shaft 3, bevel-gears $D^8$ $D^9$, having clutch or end teeth and loose on shaft $D^{14}$, toothed clutch-hub $D^{10}$ on shaft $D^{14}$, bevel-gear $D^7$, star-wheel $D^4$, shaft $D^5$, pin-wheel $D^3$, and means to move it, combined with the vertically-sliding rod $D^{13}$, connected with the said hub, and with means to move the said rod and place the hub in engagement with one or the other of the loose gears $D^8$ or $D^9$, substantially as and for the purpose described.

3. The shaft $b$, pinion $j$, pinion D', shaft $D^2$, and pin-wheel, combined with the star-wheel, shaft $D^5$, bevel-gear $D^7$ thereon, the loose bevel-gears $D^8$ $D^9$, shaft $D^{14}$, toothed hub $D^{10}$, adapted to engage one or the other of the said gears $D^8$ or $D^9$, and means to move the said hub, substantially as and for the purpose described.

4. The pivoted yoke $w^4$, the weighted levers $w$, pivoted thereon at $w^2$, the lever G, means to move it, its wedge-bar, and the selectors D, and means to support their pivots, combined with the pattern-surface and means to move it, substantially as described.

5. The yarn-beam, shaft $C^4$, connecting-gearing between them, and the ratchet and brake wheels on said shaft, combined with the whip-roll, means to keep it pressed upward against the warp, a pawl and brake, and actuating mechanism therefor intermediate the whip-roll and the said pawl and brake, substantially as described.

6. The whip-roll, the weight to lift it, rod $e^4$, the pawl-carrier $e^5$, the pawl $e^6$, the shaft $C^4$, its ratchet-wheel, worm, and hand-wheel, the warp-beam, and the worm-gear engaged by the said worm, combined with a cord or string, $e^9$, to permit the said pawl to be removed from the said ratchet when it is desired to turn the shaft $C^4$ by hand, substantially as described.

7. The yarn-beam, shaft $C^4$, gearing to connect them, the whip-roll, and means to rotate the said shaft from said whip-roll, combined with shaft $b$, means to move it, the cam $g$ thereon, the lever $g^2$, arm $g^4$, and the rod $g^3$, adjustable as to its connection with the said lever and arm, whereby the whip-roll may be pressed upward positively more or less and move the yarn-beam, substantially as described.

In testimony whereof we have signed our names to this specification in the presence of two subscribing witnesses.

GEO. CROMPTON.
HORACE WYMAN.

Witnesses:
J. B. SYME,
J. A. WARE.